(12) United States Patent
Goebel et al.

(10) Patent No.: US 8,533,420 B2
(45) Date of Patent: Sep. 10, 2013

(54) THIN PROVISIONED SPACE ALLOCATION

(75) Inventors: David A. Goebel, Vashon, WA (US);
James M. Lyon, Redmond, WA (US);
Bulat Shelepov, Bellevue, WA (US);
Robert S. Kleinschmidt, Redmond, WA (US); Mark Vayman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 395 days.

(21) Appl. No.: 12/953,474

(22) Filed: Nov. 24, 2010

(65) Prior Publication Data

US 2012/0131303 A1 May 24, 2012

(51) Int. Cl.
*G06F 12/02* (2006.01)

(52) U.S. Cl.
USPC .................................. 711/171; 711/E12.002

(58) Field of Classification Search
USPC ........................................... 711/171, E12.002
See application file for complete search history.

(56) References Cited

U.S. PATENT DOCUMENTS

| 7,130,960 | B1 | 10/2006 | Kano |
| 7,631,155 | B1 | 12/2009 | Bono et al. |
| 2008/0126734 | A1 | 5/2008 | Murase |
| 2009/0144499 | A1 | 6/2009 | Nicholson et al. |
| 2009/0240880 | A1 | 9/2009 | Kawaguchi |

OTHER PUBLICATIONS

Laliberte, Bob., "Symantec Delivers Thin Aware Veritas File System", Retrieved at <<http://eval.symantec.com/mktginfo/enterprise/white_papers/b-whitepaper_esg_symantec_delivers_thin_12_08.en-us.pdf >>, Dec. 2008, pp. 2.

Lucchesi, Ray., "Thin-provisioning options for file systems", Retrieved at <<http://www.infostor.com/index/articles/display/320203/articles/infostor/volume-12/issue-2/features/thin-provisioning-options-for-file-systems.html >>, Retrieved Date: Aug. 26, 2010, pp. 4.

*Primary Examiner* — Yong Choe
(74) *Attorney, Agent, or Firm* — Rau Patents, LLC

(57) ABSTRACT

A storage monitoring system may reside between a file system and a storage system in a thin provisioned storage system. The storage monitoring system may create space holder files within a volume, where the space holder files contain an address space not backed up with physical storage. As requests for storage space are received from a file system, the storage monitoring system may allocate physical space to the volume by provisioning portions of the physical storage device to the volume and by removing one of the space holder files. The storage monitoring system may present alerts when physical storage space is low, as well as return an amount of physical space available to a volume size request.

20 Claims, 5 Drawing Sheets

THIN PROVISIONED SPACE ALLOCATION

BACKGROUND

Storage systems that use thin provisioning may present a very large logical capacity to a file system, when in fact the storage system may not be fully backed by physical storage. In such systems, the file system may operate as if the large logical capacity exists, but when the physical storage nears capacity, data may be lost if the file system continues to write data to the storage.

In one use scenario, thin provisioning may be used in many systems where multiple volumes may be stored on a single set of physical storage. When the physical storage may be configured, an administrator may not know how much physical space each volume may use over time. Rather than partitioning the physical drive, multiple volumes may be thin provisioned. This may allow any of the logical volumes to use the physical storage resource until the physical storage is full.

SUMMARY

A storage monitoring system may reside between a file system and a storage system in a thin provisioned storage system. The storage monitoring system may create space holder files within a volume, where the space holder files contain an address space not backed up with physical storage. As requests for storage space are received from a file system, the storage monitoring system may allocate physical space to the volume by provisioning portions of the physical storage device to the volume and by removing one of the space holder files. The storage monitoring system may present alerts when physical storage space is low, as well as return an amount of physical space available to a volume size request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
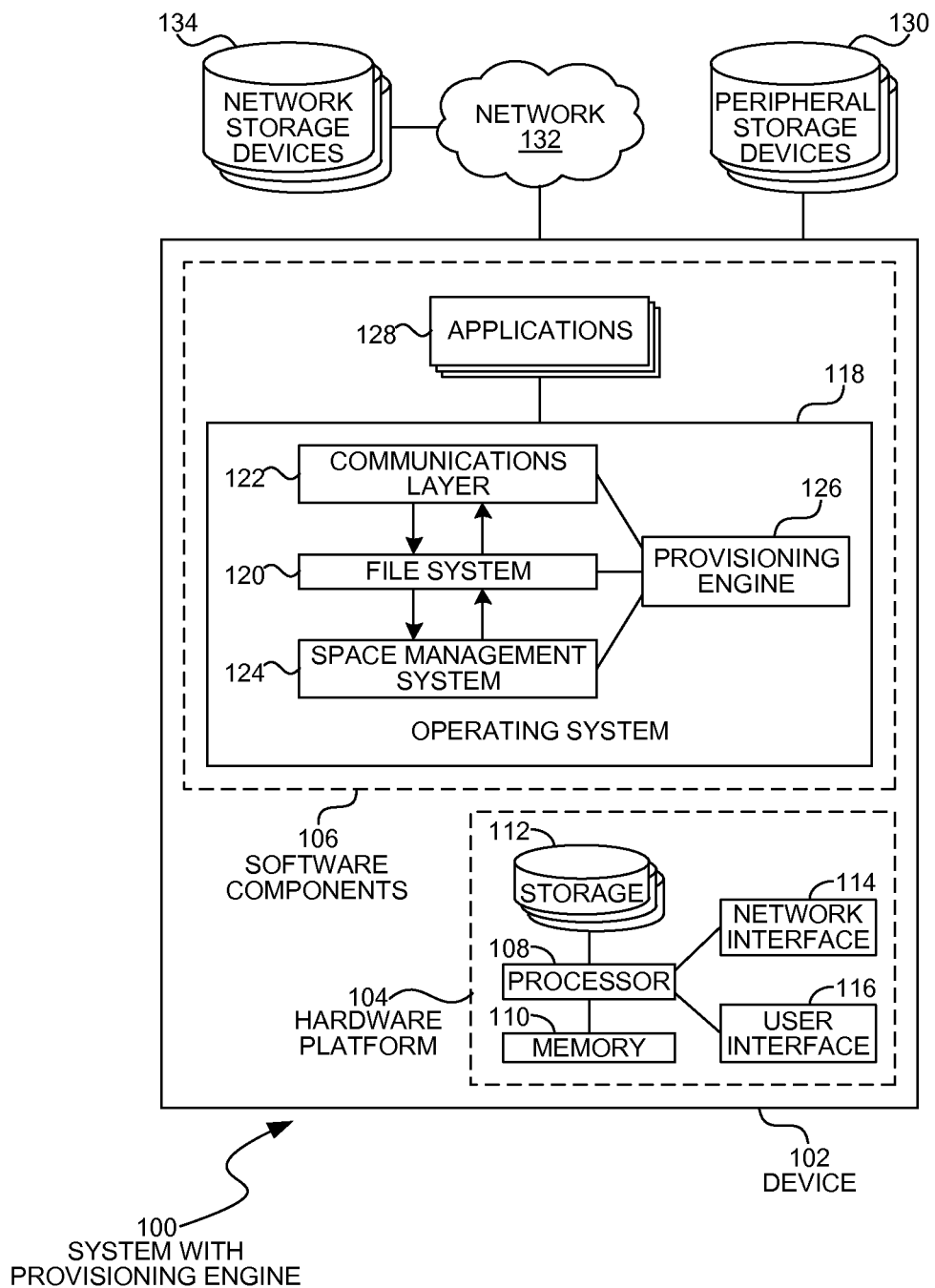
FIG. 1 is a diagram illustration of an embodiment showing a system with a provisioning engine.

A thin provisioned file system may use space holder files to occupy space within volumes, then release the space holder files to provision the volumes with physical storage space. A provisioning engine may monitor the allocated space and physical space and may be able to issue a low space warning prior to running out of physical storage space.

The system may operate by filling all of the logical volumes with space holder files. The space holder files may have addresses that are outside of the physical storage media and may appear as full volumes even when the volumes contain little or no data. As applications request more physical storage, the system may remove a space holder file and allocate physical space to the volume in the amount that the space holder file consumed.

A standard file system may be used by the system to manage files within the storage system and to respond to various file related commands. However, a communications layer may intercept the commands from applications and may ensure that enough physical space is available to respond to a file related command. The communications layer may also intercept available space requests and may process those requests separately from the file system.

Throughout this specification and claims, references may be made to logical volumes or storage and physical storage. Physical storage may refer to actual, physical storage capacity of a nonvolatile storage system. An example of physical storage may be a hard disk drive. A logical volume may be an addressable space in which a file system may operate by adding, editing, and deleting files, but the logical volume may not directly correspond with physical storage. In many embodiments, the logical volume may be the object with which a file system may interact, and a separate space management system may provide physical storage to store items within the logical volume.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system that may include a provisioning engine for managing a thinly provisioned storage system. Embodiment 100 is a simplified example of a hardware and software environment in which a provisioning engine may operate.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a system in which a thinly provisioned storage system may operate. The thinly provisioned storage system may have one or more logical volumes in which a file system may store and manage files, but where the space assigned to the volumes is more than the physical space available to store the volumes.

Thinly provisioned storage systems may be useful when multiple volumes may be stored on a single physical storage system. In an example, four volumes may be created on a physical storage system. At the time the volumes are created, it may not be known how much space each volume may eventually consume, so each volume may be created with the same storage space as the physical storage system. In such a situation, any volume may grow to consume the entire physical storage system. However, the physical storage system may be at full capacity while each volume is merely one quarter full.

Thinly provisioned storage systems may also be useful when a volume may be expected to grow over time, but a user may not wish to purchase all of the physical storage devices at startup. As the physical storage becomes used up, the user may be able to add more physical storage devices without changing the volume configuration.

The storage system may use a conventional file system to process many file related commands. Typical file systems are mechanisms for storing and organizing computer files and their data. A generic file system may organize the files into a database for the storage, organization, manipulation, and retrieval by a computer operating system. There are many different forms and implementation of file systems, each of which may have different advantages, disadvantages, and may be suitable to certain hardware or software configurations.

Embodiment 100 illustrates a mechanism whereby a file system that may not have support for thin provisioning may be converted to a thin provisioning system. Embodiment 100 may also illustrate an architecture for a thin provisioned storage system where a thin provisioned feature may be added or removed from the file system.

The thin provisioned storage system may create multiple space holder files to fill up each volume and consume address space within the volume. The space holder files may not be backed up or provisioned with physical storage, but may be deleted to free up space within a volume. The freed space within the volume may be provisioned with physical storage space and used by the file system.

Because the volumes may have much of the address space occupied by space holder files, the volume may appear to the file system as having only a small amount of available space. The file system may use the available space when creating new files or adding to existing files. The available space may be used up over time, and when the amount of available space becomes less than a lower threshold, one or more space holder files may be removed and the space allocated to the space holder files may become free to be addressed by the file system.

Some file systems may consume physical storage space in a randomized or haphazard fashion, and may spread files across all the available address space. The space holder files may limit the amount of available space within the physical storage for each volume, and may control or minimize some file system's propensity to disperse files over a large area. Some embodiments may have the ability to condense or consolidate volumes, move volumes, or perform other such operations. Having files in a contiguous space may speed up or enable such operations.

The architecture of embodiment 100 has a communications layer that may intercept communications between an application and a file system. The communications layer may redirect some file system commands and perform some processing prior to allowing the file system to process the commands.

For example, when an application sends a file system command that may request additional physical storage space, the communications layer may intercept the command and determine whether or not additional physical storage space may be used by the command. If so, space holder files may be removed to free up space to respond to the command.

In another example, a request for the available free space on the volume may be intercepted and processed without calling the file system. The storage system may calculate the available free space by determining the actual unused physical storage space. Such a request may be handled by a provisioning engine without sending the request to the file system.

Embodiment 100 illustrates a device 102 that may have a system for managing a thin provisioned storage system. The device 102 may have several volumes with addressable space, the sum of which may exceed the physical storage space available.

The device 102 is illustrated having hardware components 104 and software components 106. The controller device 102 as illustrated represents a conventional computing device, although other embodiments may have different configurations, architectures, or components.

The controller device 102 may be a server computer, desktop computer, or comparable device. In some embodiments, the controller device 102 may be a laptop computer, netbook computer, tablet or slate computer, wireless handset, cellular telephone, or any other type of computing device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The nonvolatile storage 112 may be a collection of storage devices. In some embodiments, a set of storage devices, such as disk drives, may be arranged together to provide a large amount of nonvolatile storage. In some embodiments, several devices may be aggregated using Redundant Array of Independent Disks (RAID) technologies. Many RAID systems may use storage devices of the same capacity to create a large storage system.

Some embodiments may be capable of aggregating storage devices that have different storage capacities and may use different hardware technologies. For example, such embodiments may aggregate a conventional disk drive accessed on a IDE interface with another disk drive connected using a Universal Serial Bus (USB) connection, along with a solid state storage device connected using a Small Computer System Interconnect (SCSI) interface.

Some embodiments may configure one or more volumes to be duplicated on two or more different storage devices. Such duplication may provide redundancy in the event of a failure of a single storage device. When a volume may be duplicated on two storage devices, such a volume may consume approximately twice the physical storage as a volume for which no duplication is performed.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware components 104, and may include various routines and functions that communicate directly with various hardware components.

The operating system 118 may include several components for managing thin provisioned storage. A file system 120 may manage files in a database and may respond to various commands and requests. Surrounding the file system 120 may be a communications layer 122 that may intercept and process communications between applications 128 and the file system 120. A space management system 124 may operate in between the file system 120 and the physical storage 112. A provisioning engine 126 may manage the various components to provide a thin provisioned storage system using the file system 120.

The file system 120 may provide file management functions, such as creating, deleting, and editing files. Many file systems may also permit users to organize files into directories or folders, and may permit operations to be performed on groups of files. Many different file systems are commercially available.

The thin provisioned storage system may use a conventional file system to perform some functions, but may perform additional operations before or after having the file system perform certain functions. In some cases, the thin provisioned storage system may perform operations separately and independently from the file system.

The thin provisioned storage system may manage the allocated physical space for each volume independently from the file system. When requests are received that may utilize more physical space than may be allocated to a specific volume, the space management system 124 may allocate physical space by manipulating various space holder files.

A request may be received by the communications layer 122, and the request may be analyzed to determine whether or not enough free physical space may be available to successfully perform the request. In one embodiment, a provisioning engine 126 or other component may analyze the request to determine available free physical space.

In another embodiment, the request may be transmitted to the file system 120. If a disk full error is returned, the communications layer 122 may intercept the error and cause the space management system 124 to allocate additional space. After additional space is allocated, the communications layer 122 may re-issue the original request to the file system 120.

The space management system 124 may allocate and de-allocate physical space to volumes. The space management system 124 may create multiple space holder files within the volumes, and may add or remove the space holder files to allocate and de-allocate physical space.

A space holder file may be created by a space management system in an address area that is not provisioned within the logical volume. When a space holder file may be deleted, the address space may be allocated to the physical storage system. When a space holder file may be created, the address space consumed by the space holder file may be released from the physical storage system if the space were already allocated.

The provisioning engine 126 may monitor the operations of the communications layer 122 and space management system 124 and may facilitate communication between the communication layer 122 and the space management system 124. The provisioning engine 126 may cause certain operations to be performed, and may perform some of those operations or may cause the communications layer 122, space management system 124, or the file system 120 to perform some operations.

The storage system of device 102 may use several different types of storage devices. In a conventional computer system, a hard disk or solid state storage device may be mounted internal to the computer. Some devices may have various peripheral storage devices 130, which may be an external hard disk or solid state storage device connected using USB, SCSI, or other type of interface.

Some devices may have storage that may be available through a network 132 and may be network storage devices 134. The network storage devices may be a Storage Area Network (SAN), a storage device connected through a local area network, a storage device connected through a wide area network such as the Internet, a cloud storage system, or any other type of storage device.

The various storage devices may be used independently or aggregated together to provide physical storage for the thin provisioned volumes. The provisioning engine 126 and the other components may operate to provide thin provisioned volumes across one or more storage devices.

Figure 2:
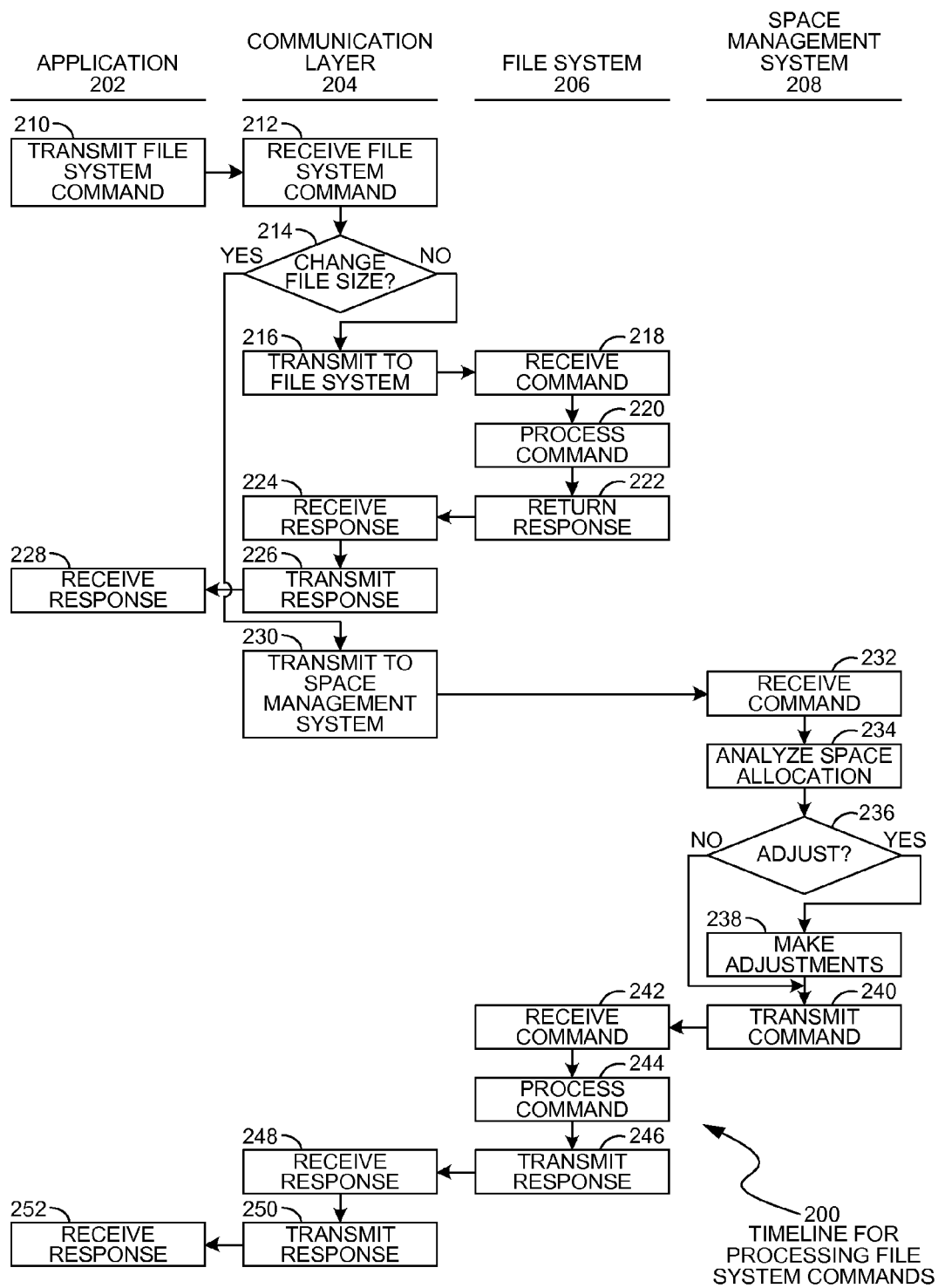
FIG. 2 is a timeline illustration of an embodiment showing a method for processing file system commands.

FIG. 2 is a timeline illustration of an embodiment 200 showing a method for processing file system commands. The process of embodiment 200 is a simplified example of how an application 202 may interact with a communication layer 204, file system 206, and space management system 208 to deliver a thin provisioned storage system.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is a timeline illustration, where the operations of the application 202 are shown in the left hand column, the operations of the communication layer 204 are shown in the second column, the operations of the file system 206 are shown in the third column, and the operations of the space management system 208 are shown in the right hand column.

Embodiment 200 is an example of an embodiment where commands may be intercepted and analyzed prior to executing the commands with a file system. If the commands may consume more physical storage space than may be currently allocated, additional physical storage space may be allocated.

An application 202 may transmit a file system command in block 210. The file system command of block 210 may be any type of operation which the file system 206 may be capable of performing. The actual commands may depend on the specific file system being used, but in general the commands may include creating, editing, and deleting files. Many file systems may have additional commands for performing directory or folder operations, plus many additional file specific operations.

The communication layer 204 may receive the file system command in block 212 and may perform some analysis of the command. If the command does not change the file size in block 214, the command may be transmitted to the file system 206 in block 216, where the file system 206 may receive the command in block 218, process the command in block 220, and return a response in block 222. The communication layer 204 may receive the response in block 224 and transmit the response in block 226 to the application 202. The application 202 may receive the response in block 228.

In contrast to the operations of blocks 216-228, if the command may change the file size in block 214, the command may be transmitted to the space management system in block 230. The space management system 208 may receive the command in block 232 and may analyze the space allocation in block 234. If the physical space may be adjusted in response to the command in block 236, the physical space adjustments may be made in block 238. After processing, the command may be transmitted in block 240 to the file system 206.

The file system 206 may receive the command in block 242, process the command in block 244, and transmit a response in block 246. The communication layer 204 may receive the response in block 248 and transmit the response in block 250 to the application 202, which may receive the response in block 252.

The adjustments of block 238 may be to allocate additional physical space to a volume. An example of such an operation may be found in embodiment 500 presented later in this specification. In some cases, the adjustments made in block 238 may be to deallocate additional physical space to a volume. An example of such an operation may be found in embodiment 400 presented later in this specification.

Embodiment 200 illustrates an example embodiment where a file system command may be analyzed prior to sending the command to the file system. In another embodiment, the communication layer may permit the command to be transmitted to the file system, but may intercept the response of the file system before the application receives the response. The communications layer may determine that a disk full error may have occurred. If so, the communications layer may communicate with the space management system to cause additional physical space to be allocated. The initial file system command may be re-transmitted to the file system and the process re-tried.

Figure 3:
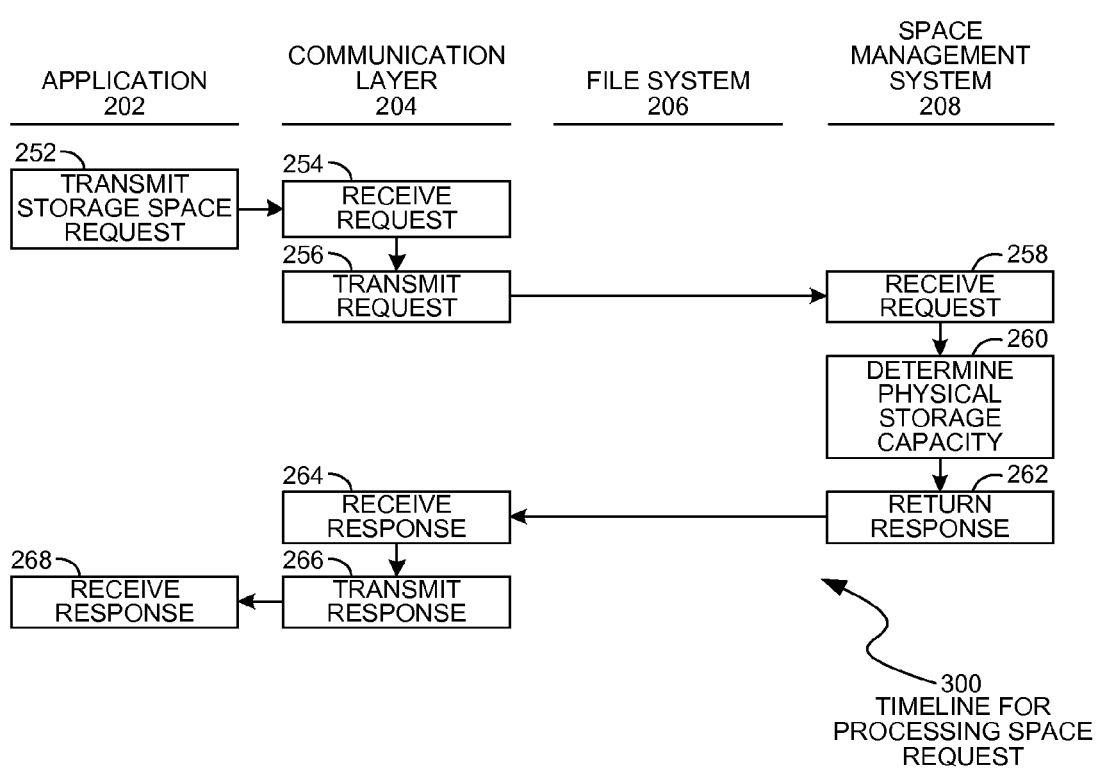
FIG. 3 is a timeline illustration of an embodiment showing an additional method for processing file system commands.

FIG. 3 is a timeline illustration of an embodiment 300 showing a method for processing a space request command. The process of embodiment 200 is a simplified example of how an application 202 may interact with a communication layer 204, file system 206, and space management system 208 to deliver a thin provisioned storage system.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is a timeline illustration, where the operations of the application 202 are shown in the left hand column, the operations of the communication layer 204 are shown in the second column, the operations of the file system 206 are shown in the third column, and the operations of the space management system 208 are shown in the right hand column.

In block 252, an application 202 may transmit a storage space request. A storage space request may request the available storage for a particular volume. In the case of a thin provisioned storage system, the logical volumes may have a large amount of addressable storage, but the physical storage may not be as large as the addressable storage.

In many cases, an application 202 may request the available storage space so that the application may perform various checks prior to performing an operation. For example, an application may ensure that sufficient storage space may be available prior to instantiating a database or prior to creating a new data file.

From the standpoint of the file system, very little storage space may appear to be available. This may be because the logical volumes may have many space holder files which may fill the addressable space, leaving a small amount of addressable space to create new files. Rather than transmit the available storage space request to the file system which may return a number substantially lower than the actual physical space available, the available storage space request may be handled by the space management system 208.

The application 202 may transmit a storage space request in block 252, which may be received in block 254 by the communication layer 204. The communication layer 204 may analyze the communication and determine that the communication may be processed by the space management system 208. The communication layer 204 may transmit the request in block 256, which may be received by the space management system 208 in block 258.

The space management system 208 may determine the available physical storage capacity in block 260, and may return a response in block 262 to the communications layer 204. The communications layer 204 may receive the response in block 264, then transmit the response in block 266 to the application 202, which may receive the response in block 268.

The available physical storage capacity determined in block 260 may not correspond with the available logical storage space, but may correspond with the available physical storage space. The available physical storage space may be calculated by determining the largest file size that could be stored on the physical storage and returning that value.

The available physical storage space may include the empty allocated physical storage space plus the empty unallocated physical storage space. In some embodiments, the available physical storage space may include the empty allocated physical storage space for the current volume, plus the empty unallocated physical storage space that has not been allocated to other volumes.

In embodiments where certain volumes may be duplicated on two or more physical storage devices, the available physical storage space may be reduced accordingly. For example, the space available in a duplicated volume may be the amount of space available on the smaller of two physical storage devices assigned to the volume. Other embodiments may have different methods to calculate the available storage, depending on the physical configuration of the storage devices and other factors.

Figure 4:
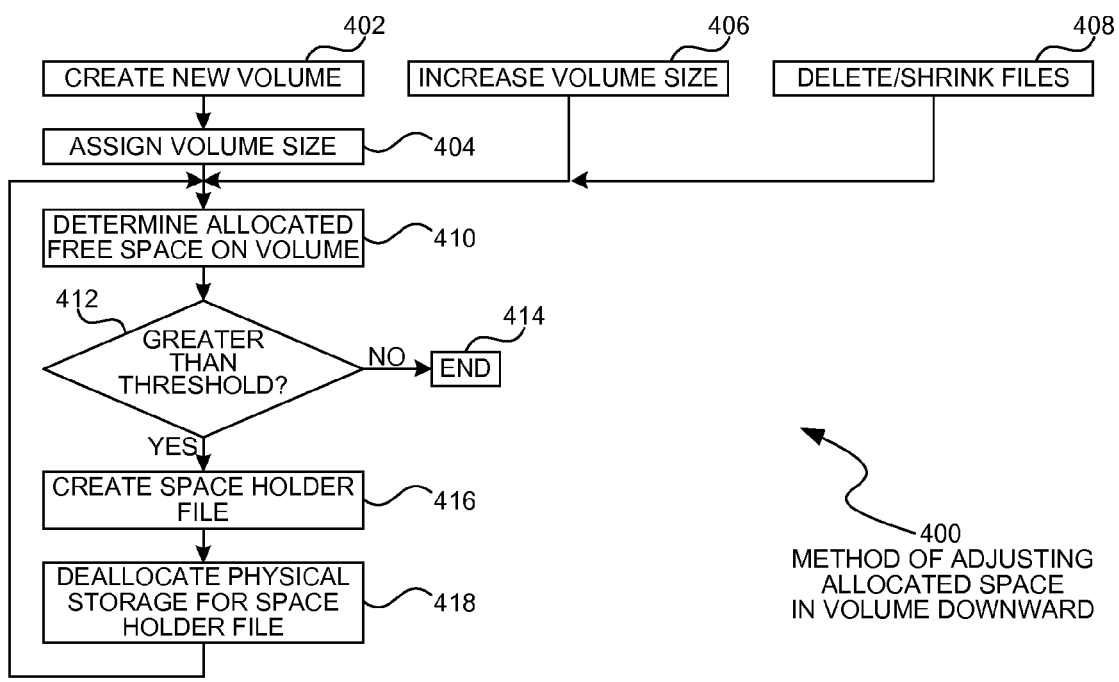
FIG. 4 is a flowchart illustration of an embodiment showing a method for adjusting allocated space downward.

FIG. 4 is a flowchart illustration of an embodiment 400 showing a method for adjusting allocated space in a volume downward. The process of embodiment 400 may be used in several situations to fill up a volume with space holder files.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is an example of how space holder files may be created within a logical volume to consume much of the addressable storage space. As storage space may be used, the space holder files may be removed and physical storage space allocated to the volume. An example of such a process may be found in embodiment 500 presented later in this specification.

Embodiment 400 may be invoked in several different situations. A new volume may be created in block 402 and a volume size may be assigned in block 404. In another situation, a request may be made to increase the volume size in block 406. In yet another situation, files may be deleted or shrunk in block 408. In any of these events, the amount of free space within the volume may exceed an upper threshold and space holder files may be added.

The allocated free space within the volume may be determined in block 410. If the amount of allocated free space is greater than an upper threshold in block 412, a space holder file may be created in block 416 and the physical space consumed by the space holder file may be deallocated in block 418. The process may loop back to block 410 repeatedly until the allocated free space is less than the upper threshold in block 412 in which case the process may end in block 414.

Figure 5:
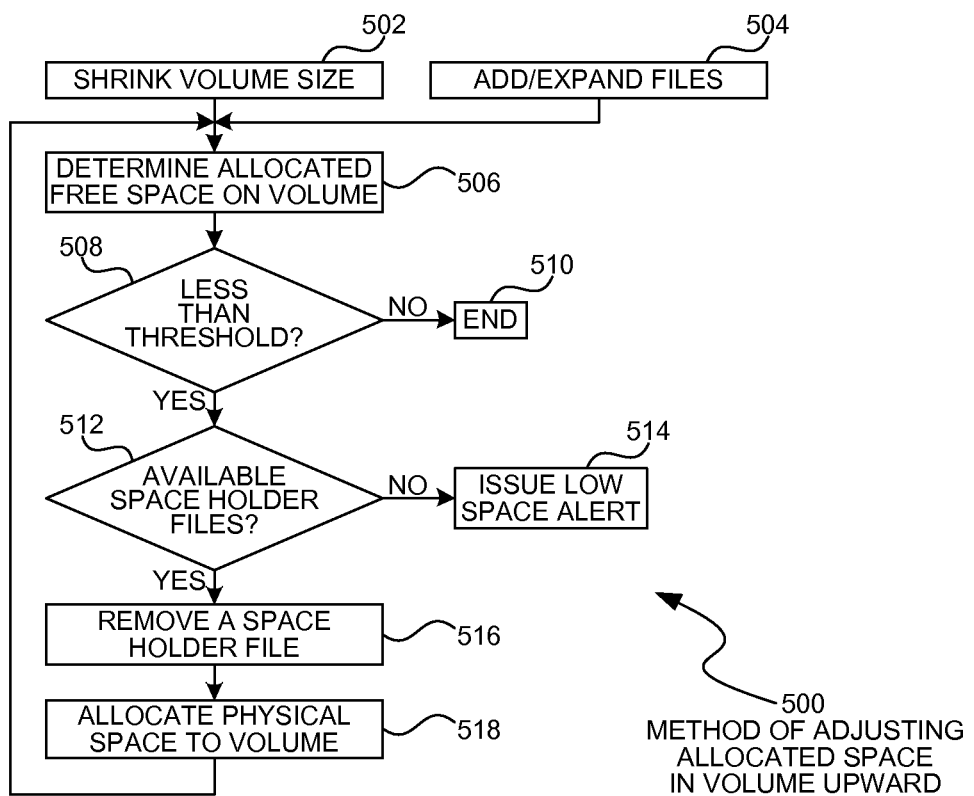
FIG. 5 is a flowchart illustration of an embodiment showing a method for adjusting allocated space upward.

FIG. 5 is a flowchart illustration of an embodiment 500 showing a method for adjusting the allocated space in a volume upward. The process of embodiment 500 may be used in several situations where additional space may be requested by a volume.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 is an example of how space holder files may be removed from a logical volume and physical storage may be allocated to the logical volume. The process may be performed until no further space holder files may be available, which may indicate that the physical storage has been consumed and an alert may be issued.

Embodiment 500 may be invoked in several different situations. A volume size may be shrunk in block 502 or files may be added or expanded in block 504.

The allocated free space within the volume may be determined in block 506. If the amount of allocated free space is less than a lower threshold in block 508 and space holder files are available within the volume in block 510, a space holder file may be removed in block 516 and the physical space consumed by the space holder file may be allocated in block 518. The process may loop back to block 506 repeatedly until the allocated free space is larger than the lower threshold in block 508, in which case the process may end in block 510.

If the allocated free space is less than the lower threshold in block 508 but no more space holder files are available in block 512, a low physical space alert may be issued in block 514. The low physical space alert of block 514 may be transmitted to a user or administrator of a computer system and may indicate that the physical storage may be fully utilized. The user or administrator may add additional physical storage devices or may remove files, compress the volumes, or otherwise use the physical storage space more efficiently.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed on a computer processor, said method comprising:

creating a plurality of space holder files on a thinly provisioned storage volume, said space holder files comprising an address space in said thinly provisioned storage volume for which no physical storage has been assigned;
operating a file system with said thinly provisioned storage volume and a physical storage system;
intercepting a file system command that requests file space;
determining if said file system command consumes more physical storage space than what is currently provisioned and provisioning said thinly provisioned storage volume with a portion of said physical storage system, said portion being at least a size equal to one of said space holder files; and
removing one of said space holder files from said file system such that said file system allocates storage space in response to said file system command.

2. The method of claim 1 further comprising:
determining that less than a lower threshold of space is available on said thinly provisioned storage volume and removing at least one of said space holder files.

3. The method of claim 2 further comprising:
removing a plurality of said space holder files until available space is higher than said lower threshold.

4. The method of claim 2 further comprising:
determining that more than an upper threshold of space is available on said thinly provisioned storage volume and adding at least one of said space holder files to said file system.

5. The method of claim 1 further comprising:
receiving a volume size request for said thinly provisioned storage volume and determining an amount of physical space available and returning said amount of physical space available.

6. The method of claim 5, said amount of physical space available comprising empty allocated physical space and empty unallocated physical space.

7. A storage space management system comprising:
a file system that manages files stored in said storage space management system;
a connection to a physical storage system;
a set of volumes being thinly provisioned on said physical storage system;
a communications layer that receives communications between an application and said file system;
a space management system that creates a plurality of space holder files within an address space of said set of volumes, said address space being within said set of volumes for which no physical storage has been assigned;
a provisioning engine that:
detects a file system command received on said communications layer, said file system command being transmitted from an application;
transmits said file system command to said file system and receives a disk full response;
detects said disk full response and provisions at least one of said volumes by deleting one of said space holder files; and
re-transmits said file system command to said file system where said file system responds with a response other than a disk full error.

8. The system of claim 7, said connection to a physical storage system comprising a network connection.

9. The system of claim 7, said file system command comprising a command that consumes additional storage space.

10. The system of claim 9, said file system command comprising a write command, said write command being successful after said re-transmit.

11. The system of claim 10, said disk full response not being transmitted to said application.

12. The system of claim 11, said disk full response being transmitted to said application only when said physical storage is full.

13. The system of claim 12, said file system command being one of a group composed of:
create file; and
edit file.

14. The system of claim 7, said management engine that further:
receives a storage space query and returns a space value equivalent to a maximum file size that is created on said physical storage system by said storage space management system.

15. The system of claim 14, at least one of said volumes being duplicated on two physical storage devices.

16. A system comprising:
a file system that receives and processes file commands to read and write files, said file system having a plurality of volumes;
a communications layer between an application and said file system, said filter that intercepts communications between said application and said file system;
a physical storage system comprising a plurality of storage devices and having a physical storage capacity;
a provisioning engine that:
allocates storage space to said volumes, a sum of said storage space allocated to each of said volumes being more storage space than said physical storage capacity;
creates a plurality of space holder files, each of said space holder files having an address that is outside any allocated physical address space;
identifies a request from said application that consumes physical storage space within a first volume and determines that insufficient storage space is available within said first volume;
deletes one of said space holder files from said first volume to free a first block of space;
causes said first block of space to be allocated onto said physical storage system; and
permits said file system to act on said request.

17. The system of claim 16, each of said volumes being initially created with a plurality of space holder files.

18. The system of claim 17, at least one of said physical storage devices being duplicated on a second physical storage device.

19. The system of claim 17, said physical storage devices comprising removable storage devices.

20. The system of claim 16, said provisioning system that further:
detects that said first volume has unused space greater than a high threshold; and
creates at least one space holder file and deallocates physical storage space corresponding to said at least one space holder file until said first volume has said unused space lower than said high threshold.

* * * * *